United States Patent
Brock et al.

(10) Patent No.: US 7,249,285 B2
(45) Date of Patent: Jul. 24, 2007

(54) ADDRESS WATCH BREAKPOINTS IN A HARDWARE SYNCHRONIZATION RANGE

(75) Inventors: John Charles Brock, Rochester, MN (US); Gregory Alan Chaney, Mantorville, MN (US); Kevin J. Erickson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 10/808,739

(22) Filed: Mar. 25, 2004

(65) Prior Publication Data
US 2005/0223293 A1 Oct. 6, 2005

(51) Int. Cl.
*G06F 11/00* (2006.01)
(52) U.S. Cl. .................. 714/34; 714/32; 714/33; 714/35
(58) Field of Classification Search ............... 714/32, 714/33, 34, 35, 48
See application file for complete search history.

(56) References Cited
U.S. PATENT DOCUMENTS

| | | | |
|---|---|---|---|
| 6,412,078 B2 * | 6/2002 | Murotani et al. ............. 714/9 |
| 6,598,177 B1 * | 7/2003 | Jones et al. ................... 714/30 |
| 6,615,374 B1 * | 9/2003 | Moran ........................ 714/48 |
| 6,691,250 B1 * | 2/2004 | Chandiramani et al. ...... 714/25 |
| 6,823,482 B2 * | 11/2004 | Ahrens et al. ................ 714/57 |
| 2002/0112203 A1 * | 8/2002 | Andress et al. ............... 714/48 |
| 2005/0160328 A1 * | 7/2005 | Lesartre et al. ............... 714/48 |

* cited by examiner

*Primary Examiner*—Scott Baderman
*Assistant Examiner*—Tim Bonura
(74) *Attorney, Agent, or Firm*—Owen J. Gamon (57) ABSTRACT

A method, apparatus, system, and signal-bearing medium that in an embodiment determine whether an instruction at which an address watch breakpoint occurs is within a hardware synchronization mechanism range in a program. If the determination is true, a special breakpoint is set following the hardware synchronization mechanism range, the address watch breakpoint is temporarily disabled, and the machine state is saved. When the program encounters the special breakpoint following the end of the hardware synchronization mechanism range, the saved machine state is presented. In this way, endless looping in programs protected by hardware synchronization mechanisms may be prevented.

15 Claims, 6 Drawing Sheets

ADDRESS WATCH BREAKPOINTS IN A HARDWARE SYNCHRONIZATION RANGE

FIELD

An embodiment of the invention generally relates to computers. In particular, an embodiment of the invention generally relates to address watch breakpoints in code protected by a hardware synchronization mechanism.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

As the sophistication and complexity of computer software increase, the more difficult the software is to debug. Bugs are problems, faults, or errors in a computer program. Locating, analyzing, and correcting suspected faults in a computer program is a process known as "debugging." Typically, a programmer uses another computer program commonly known as a "debugger" to debug a program under development.

Conventional debuggers typically support two primary operations to assist a computer programmer. A first operation supported by conventional debuggers is a "step" function, which permits a computer programmer to process instructions (also known as "statements") in a computer program one-by-one and see the results upon completion of each instruction. While the step operation provides a programmer with a large amount of information about a program during its execution, stepping through hundreds or thousands of program instructions can be extremely tedious and time consuming, and may require a programmer to step through many program instructions that are known to be error-free before a set of instructions to be analyzed is executed.

To address this difficulty, a second operation supported by conventional debuggers is a breakpoint operation, which permits a computer programmer to identify with a breakpoint a precise instruction for which it is desired to halt execution of a computer program during execution. As a result, when a computer program is executed by a debugger, the program executes in a normal fashion until a breakpoint is reached. The debugger then stops execution of the program and displays the results of the program and/or the state of the computer system to the programmer for analysis.

Typically, step operations and breakpoints are used together to simplify the debugging process. Specifically, a common debugging operation is to set a breakpoint at the beginning of a desired set of instructions to be analyzed and then begin executing the program. Once the breakpoint is reached, the debugger halts the program, and the programmer then steps through the desired set of instructions line-by-line using the step operation. Consequently, a programmer is able to more quickly isolate and analyze a particular set of instructions without having to step through irrelevant portions of a computer program.

But, sometimes the user does not know the address of the instruction to be analyzed. Instead, the user knows the name of a variable or an address of a storage location used by the program that the program may modify, and user would like the debugger to stop the program when the program modifies the contents at that storage location or in that variable. To address this need, some debuggers have a special breakpoint function, called an address watch breakpoint (AWB). When the program being debugged modifies the contents of the storage location specified by the address watch breakpoint, the debugger stops the program at the instruction that is modifying the storage. Thus, an address watch breakpoint instruction is a load or store instruction accessing a memory page being monitored as an address watch breakpoint.

Unfortunately, a debugger address watch breakpoint can cause unrecoverable system hangs when the code modifying a watched address is protected by a hardware synchronization mechanism (HSM) that enforces atomic update of a storage location. Examples of hardware synchronization mechanisms are the PowerPC larx/stcx (load and reserve/store conditional) instruction forms, specifically the lwarx/stwcx (word-aligned) and ldarx/stdcx (double-word-aligned) forms, and the Intel Itanium lock instruction prefix. Unless users exercise care during the debugging process to explicitly turn off their address watch breakpoints when they are no longer needed, these breakpoints will inadvertently be left active until the debugger is ended. When this occurs, and subsequently after the watched addresses have left the scope of execution being debugged, the watched addresses may be reused for some other variable or data that is completely unrelated to the original variable or data being watched.

In addition, the watched addresses will likely be accessed by code in a different scope that is unrelated to the code originally being debugged. If this unrelated code utilizes hardware synchronization mechanisms, then system hangs due to looping can occur unexpectedly because of the stale watches that were left active. Since hardware synchronization mechanisms require uninterrupted code flow during their execution in order to effect the storage protection they are designed to perform, when an interrupt is issued to service a watched address within a hardware synchronization mechanism code range, the hardware reservation is lost by the hardware synchronization mechanism, and a retry is required, causing an endless loop. Although the aforementioned problems have been discussed in the context of a watched variable that is out of scope, they can also occur if a watch is set on a hardware synchronization mechanism protected address that is in scope.

Without a better way to handle address watch breakpoints, developers will continue to experience difficulty when debugging programs that use hardware synchronization mechanisms.

SUMMARY

A method, apparatus, system, and signal-bearing medium are provided that in an embodiment determine whether an instruction at which an address watch breakpoint occurs is within a hardware synchronization mechanism range in a program. If the determination is true, a special breakpoint is set following the hardware synchronization mechanism range, the address watch breakpoint is temporarily disabled, and the machine state is saved. When the program encounters the special breakpoint following the end of the hardware synchronization mechanism range, the saved machine state is presented. In this way, endless looping in programs protected by hardware synchronization mechanisms may be prevented.

DETAILED DESCRIPTION

Figure 1:
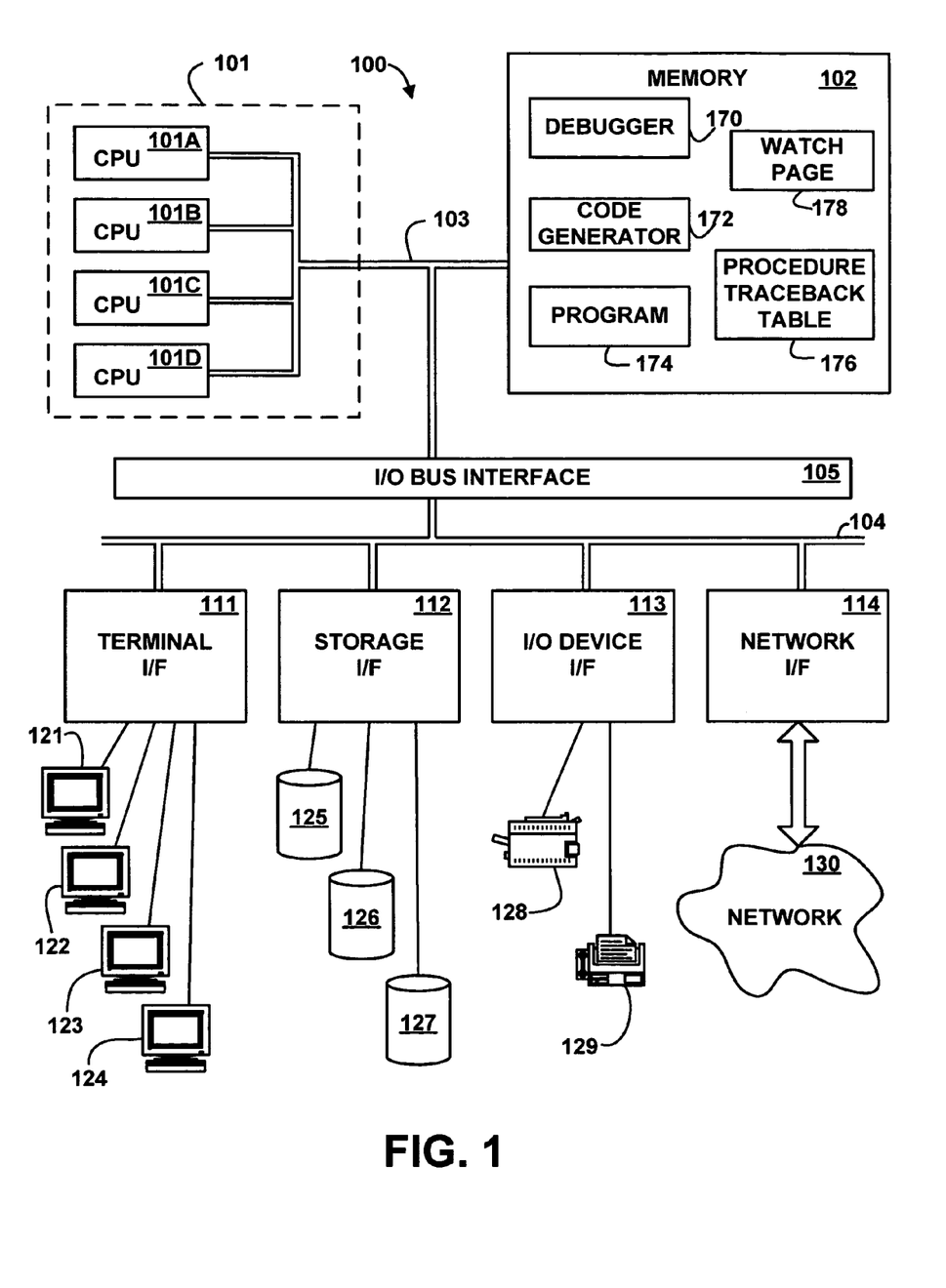
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as a processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes a debugger 170, a code generator 172, a program 174, a watch page 178, and a procedure traceback table 176. Although the debugger 170, the code generator 172, the program 174, the watch page 178, and the procedure traceback table 176 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the debugger 170, the code generator 172, the program 174, the watch page 178, and the procedure traceback table 176 are illustrated as being contained within the main memory 102, these elements are not necessarily all completely contained in the same storage device at the same time.

The debugger 170 may be used to debug the program 174 via an address watch breakpoint. In an embodiment, the debugger 170 includes instructions capable of executing on the processor 101 or statements capable of being interpreted by instructions executing on the processor 101 to perform the functions as further described below with reference to FIGS. 5A and 5B. In another embodiment, the debugger 170 may be implemented in microcode. In another embodiment, the debugger 170 may be implemented in hardware via logic gates and/or other appropriate hardware techniques.

At compilation time of the program 174, the code generator 172 recognizes the code ranges of the hardware synchronization mechanism and, in response, creates entries in the procedure traceback table 176. In an embodiment, the code generator 172 includes instructions capable of executing on the processor 101 or statements capable of being interpreted by instructions executing on the processor 101 to perform the functions as further described below with reference to FIG. 4. In another embodiment, the code generator 172 may be implemented in microcode. In another embodiment, the code generator 172 may be implemented in hardware via logic gates and/or other appropriate hardware techniques.

The program 174 contains code to be debugged that executes on the processor 101. The program 174 modifies an address in the watch page 178, which is being watched by an address watch breakpoint implemented via the debugger 170. The program 174 is further described below with reference to FIG. 2A The procedure traceback table 176 describes the location in the program 174 that is being protected by a hardware synchronization mechanism. The procedure traceback table 176 is further described below with reference to FIG. 3.

The watch page 178 contains an address (which is being watched by the address watch breakpoint), the contents of which may be modified by the code in the program 174. The watch page 178 is further described below with reference to FIG. 2B.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

It should be understood that FIG. 1 is intended to depict the representative major components of the computer system 100 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127) or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2A:
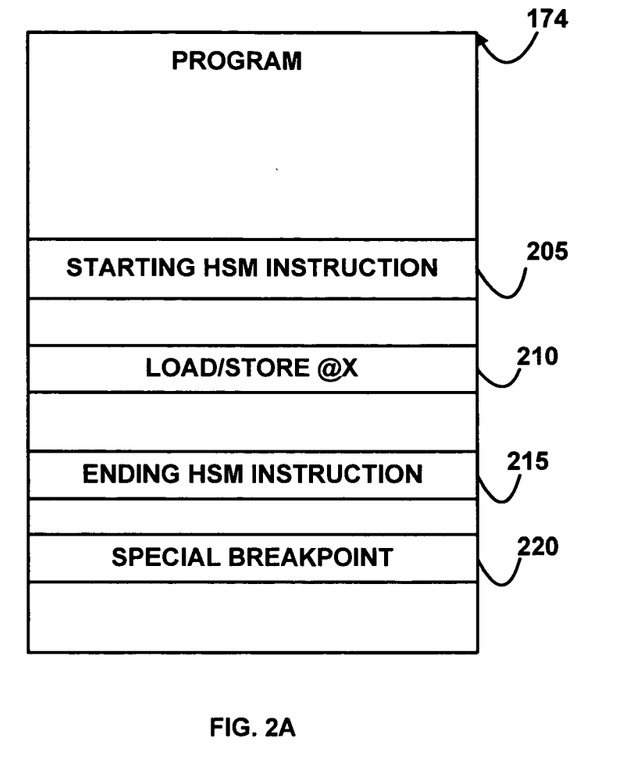
FIG. 2A depicts a block diagram of an example program to be debugged, according to an embodiment of the invention.

FIG. 2A depicts a block diagram of an example program 174, according to an embodiment of the invention. The program 174 includes a starting hardware synchronization mechanism instruction 205, an address watch breakpoint instruction 210, an ending hardware synchronization mechanism instruction 215, and a special breakpoint 220.

The starting hardware synchronization mechanism instruction 205 and the ending hardware synchronization mechanism instruction 215 represent a hardware synchronization mechanism (HSM) that enforces atomic update of a storage location. Examples of hardware synchronization mechanisms are the PowerPC larx/stcx (load and reserve/store conditional) instruction forms, specifically the lwarx/stwcx (word-aligned) and ldarx/stdcx (double-word-aligned) forms, and the Intel Itanium lock instruction prefix.

The instruction 210 modifies the address location represented by "X." The address X is in the watch page 178, as further described below with reference to FIG. 2B. The user has set an address watch breakpoint at address X via the debugger 170. When the contents of the storage location at address X are modified, the processor 101 causes an interrupt at the instruction that does the modifying, which in this case is the instruction 210. The storage location at address X is further described below with reference to FIG. 2B.

The debugger 170 inserts the special breakpoint 220 into the program 174, as further described below with reference to FIGS. 5A and 5B.

Figure 2B:
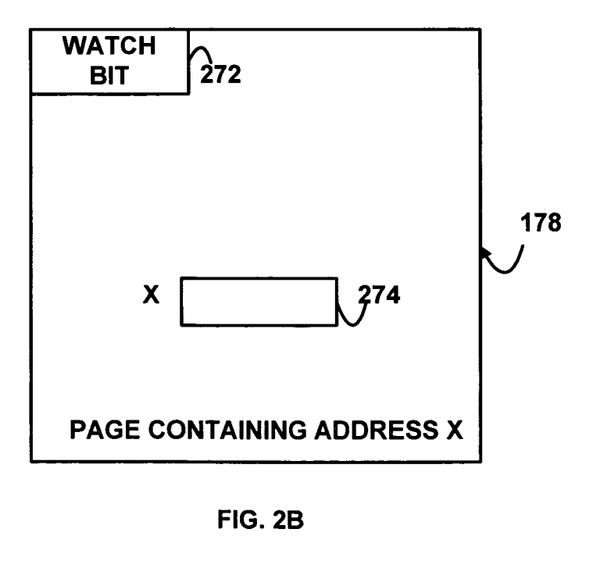
FIG. 2B depicts a block diagram of an example data structure for a page having an address being watched by an address watch breakpoint, according to an embodiment of the invention.

FIG. 2B depicts a block diagram of an example data structure for a page 178 having a watch bit 272, according to an embodiment of the invention. The page 178 further includes a storage location 274, at the address X. The watch bit 272 indicates whether the page 178 contains an address that is being watched. Although a bit is used in this embodiment, in other embodiments any appropriate amount of storage or type of indicator may be used to indicate whether the page 178 contains an address that is being watched. The debugger 170 has a list of all the watches in the page 178. When the program 174 modifies the contents of the storage location 274, the processor 101 causes an interrupt at the instruction that modified the contents of the storage location 274. In the embodiment shown, that instruction that modified the contents of the storage location 274 is the instruction 210 (FIG. 2A).

Figure 3:
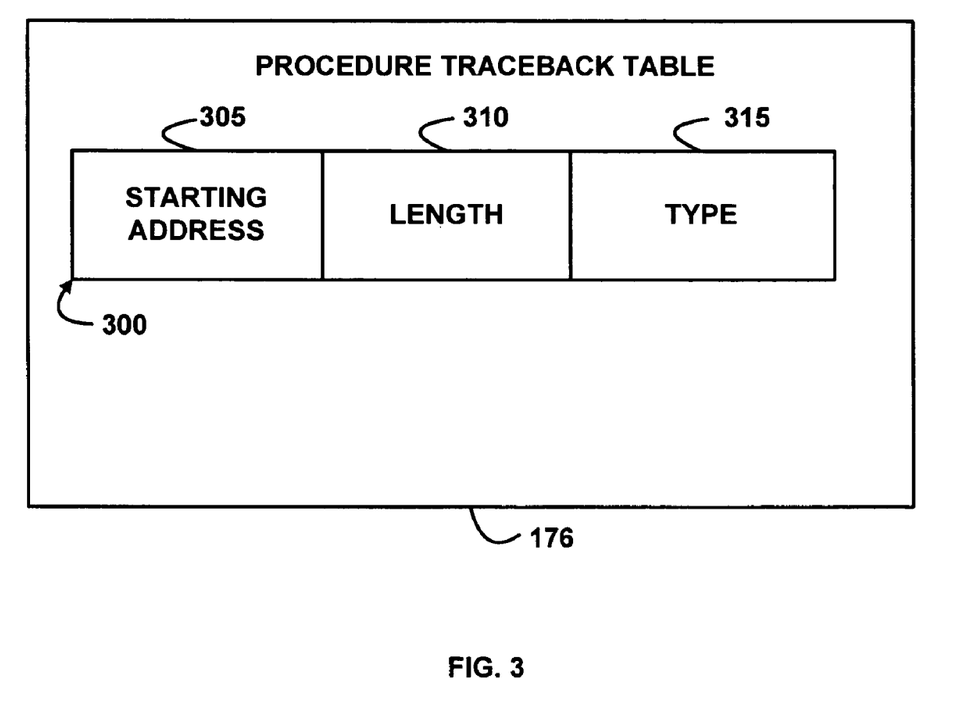
FIG. 3 depicts a block diagram of an example data structure for a procedure traceback table, according to an embodiment of the invention.

FIG. 3 depicts a block diagram of an example data structure for the procedure traceback table 176, according to an embodiment of the invention. The procedure traceback table 176 includes an entry 300 that has a starting address field 305, a length field 310, and a type field 315. Although only one entry 300 is shown, in other embodiments any number of entries may be present. The entry 300 describes the range of the code in the program 174 that is protected by the hardware synchronization mechanism.

The starting address 305 indicates the address of the starting hardware synchronization mechanism instruction 205. The length 310 indicates the length from the starting hardware synchronization mechanism instruction 205 to the ending hardware synchronization mechanism instruction 215. The type 315 indicates that this entry 300 is a hardware synchronization mechanism entry in the procedure traceback table 176. The entry 300 in the procedure traceback table 176 is created by the code generator 172, as further described below with reference to FIG. 4.

Figure 4:
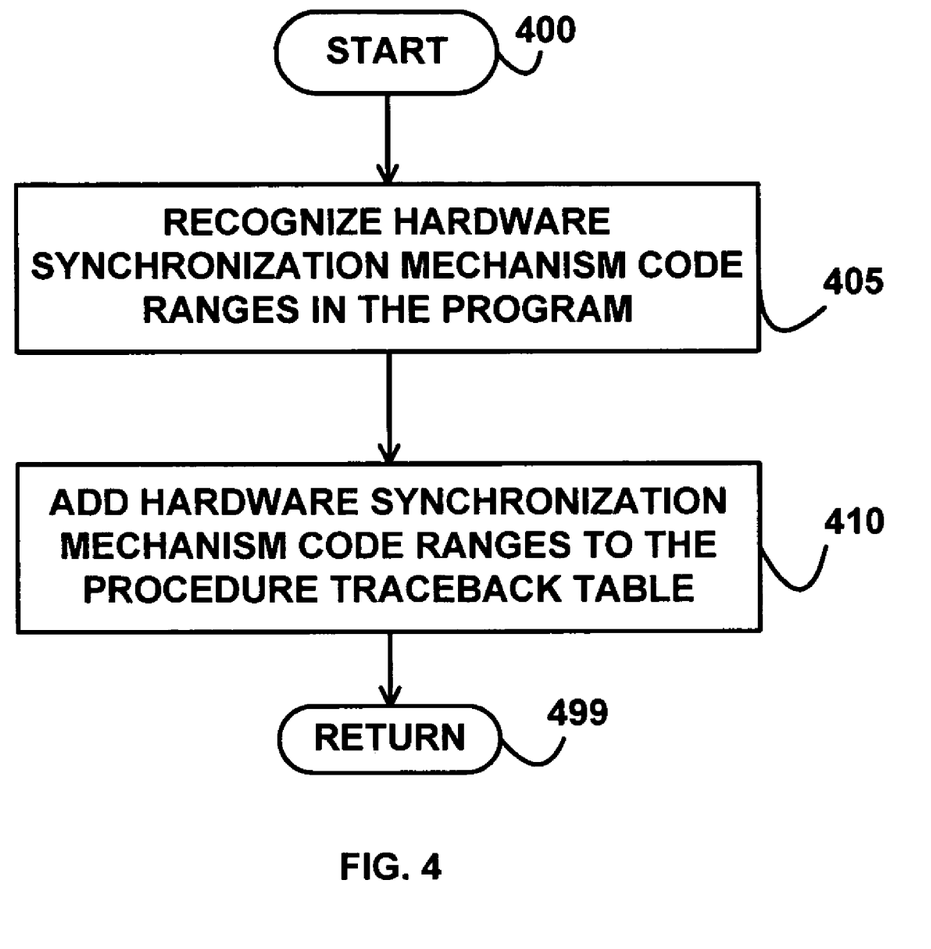
FIG. 4 depicts a flowchart of example processing for recognizing hardware synchronization mechanism code ranges in a program being debugged, according to an embodiment of the invention.

FIG. 4 depicts a flowchart of example processing for recognizing hardware synchronization mechanism code ranges in the program 174, according to an embodiment of the invention. The logic illustrated in FIG. 4 for the code generator 172 may be part of the compilation of the program 174.

Control begins at block 400. Control that continues to block 405 where the code generator 172 recognizes the hardware synchronization mechanism code ranges in the program 174. The code generator 172 recognizes the hardware synchronization mechanism code ranges via the starting hardware synchronization mechanism instruction 205 and the ending hardware synchronization mechanism instruction 215, as previously described above with reference to FIG. 2A.

Control then continues to block 410 where the code generator 172 adds the hardware synchronization mechanism code ranges to the procedure traceback table 176, in the form of the starting address field 305, the length field 310, and the type field 315, as previously described above with reference to FIG. 3. Control then continues to block 499 where the logic of FIG. 4 returns.

Figure 5A:
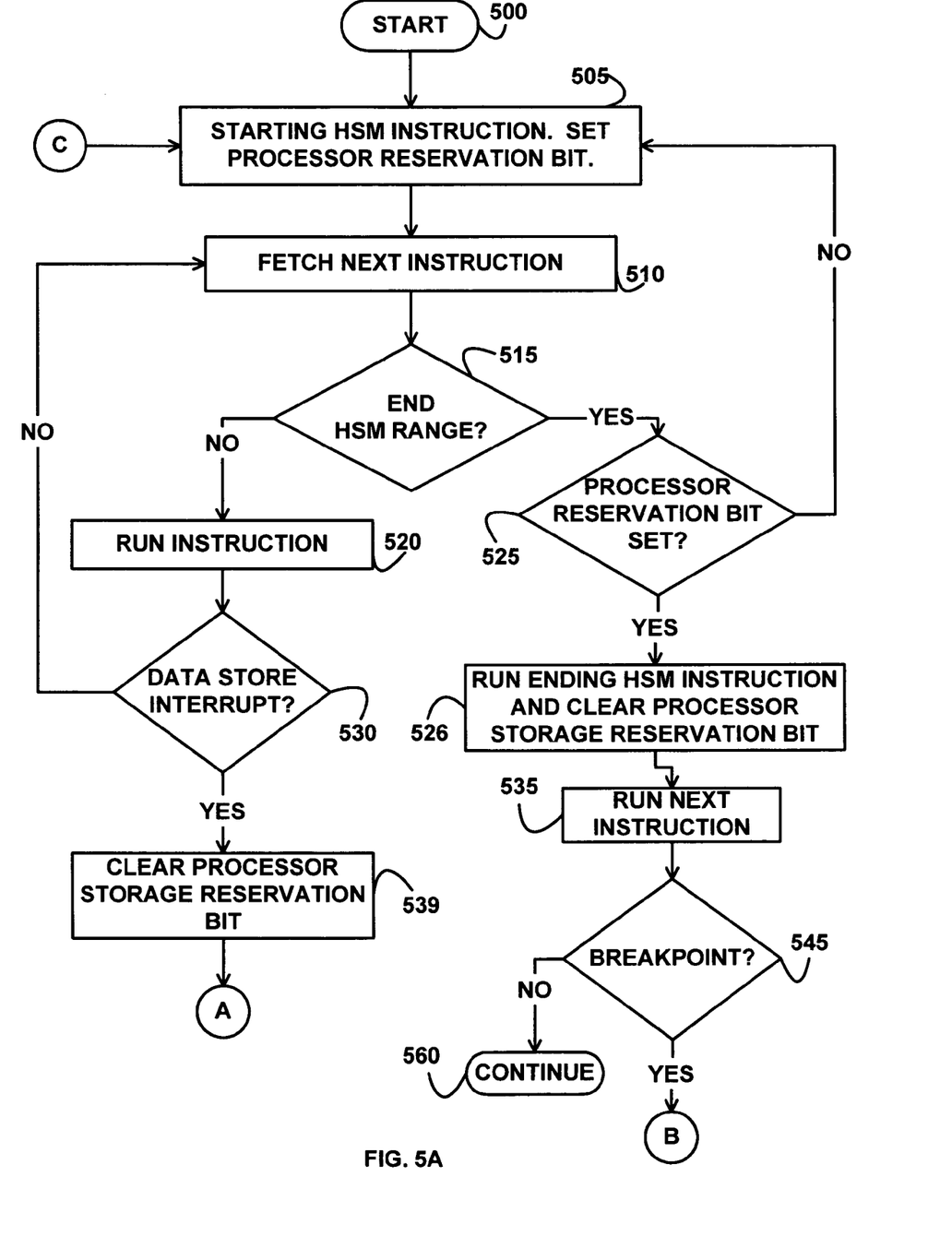
FIG. 5A depicts a flowchart of example processing for handling hardware synchronization mechanism ranges by a debugger, according to an embodiment of the invention.
Figure 5B:
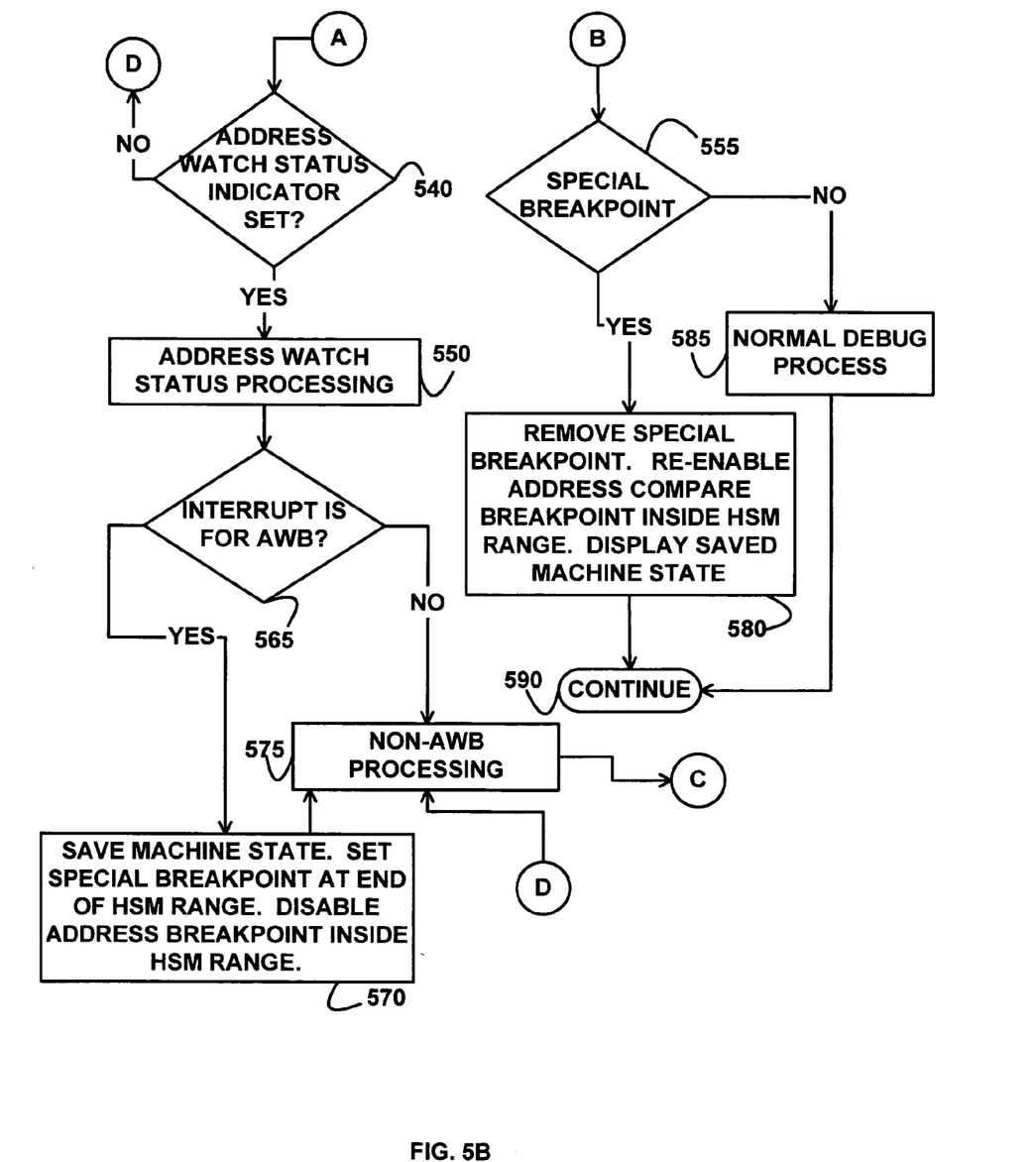
FIG. 5B depicts a flowchart of further example processing for handling hardware synchronization mechanism ranges by a debugger, according to an embodiment of the invention.

FIGS. 5A and 5B depict flowcharts of example processing in the processor 101 and the debugger 170 for handling hardware synchronization mechanism ranges, according to an embodiment of the invention. Control begins at block 500. Control then continues to block 505 where the program 174, when executing on the processor 101, encounters the starting hardware synchronization mechanism instruction 205. The starting hardware synchronization mechanism instruction 205 causes a storage reservation, which results in the processor 101 setting a storage reservation indicator in the processor 101. Additional actions specified by the starting hardware synchronization mechanism instruction 205, such as loading a value from memory to a register, may also be performed. Control then continues to block 510 where the processor 101 fetches the next instruction of the program 174.

Control then continues to block 515 were the processor 101, when examining the instruction previously fetched at block 510, determines whether the instruction is the ending hardware synchronization mechanism instruction 215. If the determination at block 515 is false, then the instruction is not the ending hardware synchronization mechanism instruction 215, so control continues to block 520 where the processor 101 executes the instruction previously fetched at block 510 and examined in block 515.

Control then continues from block 520 to block 530 where, if the instruction of block 520 causes a data store interrupt, then the processor 101 invokes a data store interrupt handler, transferring control to block 539. An instruction causing a data store interrupt can be any storage access instruction and is not limited to instructions storing values into storage, but can also be instructions retrieving values from storage. At block 539, the data store interrupt handler runs. When a storage interrupt has occurred, the interrupt handler clears the storage reservation indicator set previously at block 505. Interrupt handler control then continues to block 540 where the interrupt handler determines, by looking at the processor 101 status indicators, if an address watch breakpoint is active. The processor 101 has an address watch status indicator set to reflect an active address watch breakpoint whenever an address watch breakpoint is established. The address watch status indicator remains set as long as there is at least one active address watch breakpoint and is cleared when the last address watch breakpoint is removed.

If an address watch status indicator is set at block 540, then at least one address watch breakpoint is active, so interrupt control is transferred to the debugger 170 at block 550. Control then continues to block 565 where the debugger 170 determines whether the storage accessed by the interrupted instruction 210 is on a page watched by an address watch breakpoint. If the determination at block 565 is true, then the storage accessed by the interrupted instruction 210 is on a page watched by an address watch breakpoint, so control continues to block 570 where the debugger 170 performs the following five actions.

First, the debugger 170 saves the machine state reflecting the interrupt. Second, the debugger 170 finds the last instruction protected by the hardware synchronization mechanism. The debugger 170 finds the last instruction by finding the procedure traceback table 176 for the address of the interrupted instruction 210, and by finding if there is a entry 300 with the start 205 and end 215 of the hardware synchronization mechanism. Third, the debugger 170 sets a special breakpoint 220 after the last instruction 215 of the hardware synchronization mechanism. The special breakpoint 220 indicates it is for an address watch inside a hardware synchronization mechanism and includes pointers to the address watch breakpoint instruction 210 and to the saved machine state. Fourth, the debugger 170 disables the address watch breakpoint inside the hardware synchronization mechanism. The address watch breakpoint must be disabled to allow the processor 101 to completely run the instructions of the hardware synchronization mechanism without a data store interrupt occurring. Fifth, the debugger 170 returns to the data store interrupt hander. The data store interrupt handler completes processing of the data store interrupt in block 575. The data store interrupt handler performs a return from interrupt, which resumes the processor 101 execution of the program 174, at which point the processor 101 resumes execution at the first instruction 205 in the hardware synchronization mechanism range, as previously described above with reference to block 505.

If the determination at block 565 is false, then the storage accessed by the interrupted instruction 210 is not on a page that has an address watch breakpoint set, so control continues to block 575 where the data store interrupt handler completes processing of the data store interrupt and performs a return from interrupt. Control then returns to block 505, as previously described above.

If the determination at block 540 is false, then the address watch status indicator is not set, so non-address watch status processing is performed at block 575, and the previous clearing of the storage reservation indicator causes the processor 101 to resume the program 174 at the start of the hardware synchronization mechanism instruction 205 and control returns to block 505, as previously described above.

If the determination at block 530 is false, then no data store interrupt has occurred, so control returns from block 530 to block 510 where the next instruction is processed, as previously described above.

If the determination at block 515 is true, then the fetched instruction is the ending hardware synchronization mechanism instruction 215, so control continues from block 515 to block 525 where the processor 101 examines the storage reservation indicator. If the indicator is not set, the processor 101 resumes execution of the program 174 at the start 205 of the hardware synchronization mechanism because the reservation has been lost, and control returns to block 505, as previously described above.

If the determination at block 525 is true, then the storage reservation indicator is set, so the hardware synchronization mechanism has completed, so control continues to block 526 where the processor 101 runs the ending hardware synchronization mechanism instruction and clears the processor storage reservation indicator. Control then transfers to block 535 where the instruction 220 following the hardware synchronization mechanism is executed on the processor 101.

Control then continues to block 545 where the processor 101 tests the instruction 220 to determine if it is a breakpoint. If the determination at block 545 is false, then the instruction 220 is not a breakpoint, so control continues to block 560 where the execution of the program 174 on the processor 101 resumes.

If the determination at block 545 is true, then the instruction 220 is a breakpoint, so control continues to block 555 where the debugger 170 determines if the breakpoint found is the special breakpoint that was set at block 570, as previously described above.

If the determination at block 555 is false, then the breakpoint is not a special breakpoint, so control continues to block 585 where the debugger 170 performs ordinary breakpoint processing. Control then continues to block 590 where execution of the program 174 on the processor 101 resumes.

If the determination at block 555 is true, then breakpoint is a special breakpoint, so control continues to block 580 where the debugger 170 performs processing on the special breakpoint. The debugger 170 removes the special breakpoint from the program 174, re-enables the address watch breakpoint in the hardware synchronization mechanism, and displays the saved machine state pointed to by the special breakpoint. When the debugger 170 returns from displaying the special breakpoint, control continues to block 590 where the program 174 continues executing on the processor 101.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
   determining whether an instruction at which an address watch breakpoint occurs is within a hardware synchronization mechanism range in a program; and if the determining is true, setting a special breakpoint following the hardware synchronization mechanism range;

temporarily disabling the address watch breakpoint if the determining is true;

saving a machine state if the determining is true; and determining whether a processor storage reservation indicator is set after encountering an end of the hardware synchronization mechanism range.

2. The method of claim 1, further comprising:

detecting whether the processor storage reservation indicator has been cleared during processing of the address watch breakpoint.

3. The method of claim 1, further comprising:

presenting the machine state after the special breakpoint is encountered.

4. An apparatus comprising:

means for determining whether an instruction at which an address watch breakpoint occurs is within a hardware synchronization mechanism range in a program;

means for setting a special breakpoint following the hardware synchronization mechanism range if the means for determining is true;

means for temporarily disabling the address watch breakpoint and saving a machine state if the means if the means for determining is true; and means for determining whether a processor storage reservation indicator is set after encountering an end of the hardware synchronization mechanism range.

5. The apparatus of claim 4, further comprising:

means for detecting a clearing of the processor storage reservation indicator after the instruction at which the address watch breakpoint occurs is encountered.

6. The apparatus of claim 4, further comprising:

means for presenting the machine state after the special breakpoint is encountered if the processor storage reservation indicator is set.

7. A storage medium encoded with instructions, wherein the instructions when executed comprise:

determining whether an instruction at which an address watch breakpoint occurs is within a hardware synchronization mechanism range in a program;

setting a special breakpoint following the hardware synchronization mechanism range if the determining is true;

temporarily disabling the address watch breakpoint if the determining is true;

saving a machine state if the determining is true; and determining whether a processor storage reservation indicator is set after encountering an end of the hardware synchronization mechanism range.

8. The storage medium of claim 7, further comprising:

detecting a clearing of the processor storage reservation indicator after the instruction at which the address watch breakpoint occurs is encountered.

9. The storage medium of claim 7, wherein the special breakpoint comprises pointers to the machine state and the instruction at which the address watch breakpoint occurred.

10. The storage medium of claim 7, further comprising:

presenting the machine state after the special breakpoint is encountered if the processor storage reservation indicator is set.

11. A computer system comprising:

a processor; and a main memory encoded with instructions, wherein the instructions when executed on the processor comprise:

determining whether an instruction at which an address watch breakpoint occurs is within a hardware synchronization mechanism range in a program, setting a special breakpoint following the hardware synchronization mechanism range if the determining is true, temporarily disabling the address watch breakpoint if the determining is true, saving a machine state if the determining is true, and determining whether a processor storage reservation indicator is set after encountering an end of the hardware synchronization mechanism range.

12. The computer system of claim 11, wherein the instructions further comprise:

detecting a clearing of the processor storage reservation indicator after the instruction at which the address watch breakpoint occurs is encountered.

13. The computer system of claim 11, wherein the instructions further comprise:

presenting the machine state if the processor storage reservation indicator is set after encountering an end of the hardware synchronization mechanism range.

14. The computer system of claim 11, wherein the instructions further comprise:

presenting the machine state after the special breakpoint is encountered if the processor storage reservation indicator is set.

15. The computer system of claim 11, wherein the special breakpoint comprises pointers to the machine state and the instruction at which the address watch breakpoint occurred.

* * * * *